United States Patent Office 3,058,855
Patented Oct. 16, 1962

3,058,855
COLORING OF OXIDE-COATED ALUMINUM
Ben H. Kirby, Jr., Lock Haven, and William C. Cochran, Pittsburgh, Pa.; said Cochran assignor to Aluminum Company of America, Pittsburgh, Pa., a corporation of Pennsylvania, and said Kirby assignor to Koppers Company, Inc., a corporation of Delaware
No Drawing. Filed Apr. 16, 1959, Ser. No. 806,739
11 Claims. (Cl. 148—6.1)

This invention relates to colored oxide-coated aluminum surfaces and to a method of preparing the same. In one specific aspect, it relates to a method of applying water-insoluble, acid-soluble vat dyestuffs to oxide-coated aluminum to produce an exceptionally light fast coloring on the surface of the aluminum.

The term "aluminum" used herein includes both the metal aluminum and aluminum base alloys. "Oxide-coated aluminum" refers to an aluminum having an oxide coating artificially formed on the surface thereof by any of various electrical and chemical methods. Conveniently, the aluminum may be made the anode in an electrolytic cell containing an electrolyte, such as sulfuric acid, oxalic acid or chromic acid. When external electrical energy is impressed upon the cell, an oxide coating is formed on the anode. In another method, the aluminum is immersed in a suitable solution, generally alkaline, and the oxide coating is formed by chemical reaction without the use of external electrical energy.

Workers in the art have long been in quest of a satisfactory method for producing a light fast coloring on oxide-coated aluminum surfaces, particularly anodized aluminum surfaces. It is conventional to color anodized aluminum by forming an aqueous dye solution using water-soluble dyes at a carefully controlled pH, and dyeing the anodized aluminum surface therewith. Unfortunately, this process is subject to numerous disadvantages; in particular the dye solution must be buffered and the pH thereof must be carefully controlled within narrow limits, which vary with the particular dyestuff used. Furthermore, the method is limited to water-soluble dyestuffs which, as a class, generally do not provide a desired light fast coloring on oxide-coated aluminum surfaces, which is required for many applications. It is well known that increasing the number of solubilizing groups, e.g. SO₃H, SO₃Na, and the like, of a dye molecule tends to decrease markedly the light fastness obtained. Using an aqueous dye solution, dyeing generally takes about 10 minutes and the temperature of the solution must be carefully controlled to avoid premature sealing of the oxide pores, which occurs at temperatures above about 70–80° C. in the presence of water. Salt formation in the aqueous dye solution is also a problem, since over a long period of time the build-up of various organic and inorganic salts causes a precipitation of the dye from the solution. It has also been proposed to color anodized aluminum using a dye solution comprising a small percentage of dye dissolved in acetone or alcohol. These solvents are only suitable for use with a small class of dyestuffs. Unfortunately, none of the known methods are suitable for applying vat colors to aluminum, since vat dyestuffs are relatively insoluble in all of the above-mentioned solvents. Furthermore, with few exceptions, it has not been possible, using the aforementioned conventional techniques, to obtain a colored aluminum of desired light fastness, especially in pastel shades.

Quite surprisingly, we have discovered a novel method of coloring oxide-coated aluminum with a class of water-insoluble, acid-soluble vat dyes to provide aluminum panels in a variety of remarkably light fast colors.

It is, therefore, an object of the present invention to provide a new method for dyeing oxide-coated aluminum, particularly anodized aluminum and to produce thereby colored aluminum surfaces for architectural, automotive and other decorative applications in a variety of light fast colors, including light pastel shades thereof.

In accordance with the invention, a dye solution, consisting essentially of a water-insoluble, acid-soluble vat dyestuff dissolved in a suitable strong acid pasting acid, is formed. The dye solution is then applied to oxide-coated aluminum surfaces, preferably at a temperature not exceeding about 75° C. The dye particles are thereafter insolubilized within the pores of the aluminum oxide coating by flushing or downing with an aqueous diluent, such as water or water vapor.

The light fastness of the color thus produced on the aluminum may be considerably enhanced by protecting the color within the oxide pores from unnecessary exposure. Conveniently, this is accomplished by sealing the pores of the oxide coating by immersing the aluminum in a hot aqueous bath or by other sealing treatments.

We have already indicated that the aluminum suitable for use in the invention includes both aluminum metal and commercial aluminum alloys which may contain, for example, 5 percent or less of silicon, copper, magnesium, zinc, and other metals. The aluminum is oxide-coated, preferably by an anodic oxidation process conventional in the art. One excellent anodic oxidation process comprises making aluminum surface the anode in an electrolyte, comprising 12 to 18 percent by weight sulfuric acid in distilled water, at a current density of about 10 to 15 amperes per square foot at a temperature of about 70° F. for about one hour or less. The thickness of the aluminum oxide coating and the size and number of the pores can be carefully controlled as desired by varying the anodizing conditions.

After anodizing is completed it is preferable, although not essential, to pre-treat the anodized surfaces before dyeing to remove any traces of the electrolyte that may be present. Conveniently, this may be accomplished by washing the anodized surfaces thoroughly in distilled water and then allowing them to soak in a 50 percent by weight solution of nitric acid for one to ten minutes at room temperature. After the nitric acid dip, the anodized surfaces are given a further rinse in distilled water, and thereafter dried. Whether or not the oxide-coated aluminum is pre-treated, a thorough drying is preferred, since superficial moisture may interfere with the adsorption of dye within the oxide pores.

The dyestuffs useful in the present invention are the water-insoluble, acid-soluble vat dyestuffs. Generally speaking, these vat dyes comprise the benzoquinones, napthoquinones, acylaminoanthraquinones, benzanthraquinones, pyrenediones, anthanthrones, dibenzopyrenediones, pyranthrones, dibenzanthrones, polyisocyclicquinones, anthrimides, anthraquinonecarbazoles, anthrapyrazolones, anthraquinoneoxazoles, anthraquinonethiazoles, anthraquinoneimidazoles, anthraquinone thiophenes, anthraquinone oxadiazoles, pyridones, benzanthroneacridines, flavanthrones, anthraquinoneacridones, anthrapyrimidines, pyrazines, anthraquinoneazines, anthraquinonetriazines, thiapyrans, thiaxanthones, metoxazones triazines, pyrans, diacridines, acridone/acridines indigos thioindigos, bis-benzimidazodiazapyrenediones, and azo-type vat dyes.

Specific dyes useful in the invention include, but are not limited to, those appearing hereunder in Table I.

TABLE I

| Vat Dyestuff (name or structural formula) | Old or New Color Index No. |
|---|---|
| 2,5-dianilino-p-quinone | C.I. 56000. |
| 1-benzoylaminoanthraquinone | C.I. 60515. |
| 1,5-dibenzoylaminoanthraquinone | C.I. Vat Yellow 3. |
| 1-benzoylamino-4-hydroxyanthraquinone | C.I. Vat Red 21. |
| 1,2-benzanthraquinone | C.I. 59000. |
| 5,10-dianilino-3,8-dichloro-1,6-pryenedione | C.I. 59050. |
| Dichloroanthanthrone | C.I. Vat Orange 19. |
| Dibromoanthanthrone | C.I. Vat Orange 3. |
| Bromoiodoindanthrone | C.I. Vat Red 37. |
| Dibenzopyrene-7,14-dione | C.I. Vat Yellow 4. |
| N-methyl-1,(N),9-anthrapyridone | C.I. 68230. |

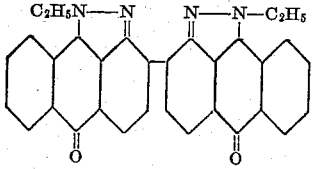

C.I. Vat Red 13.

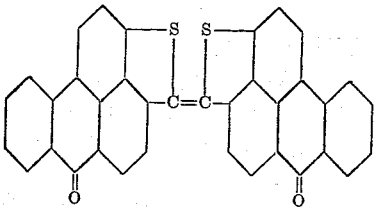

C.I. Vat Blue 7.

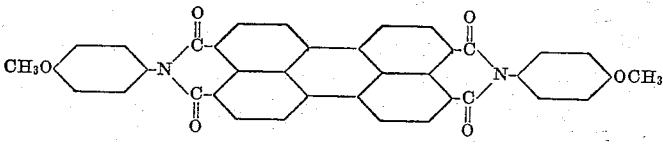

C.I. Vat Red 29.

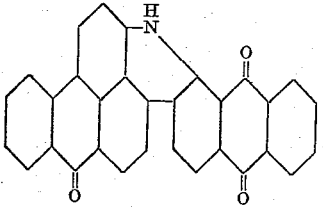

C.I. Vat Green 3.

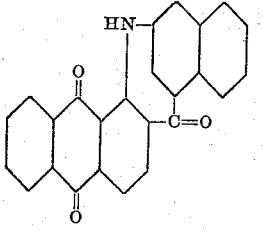

C.I. Vat Red 35.

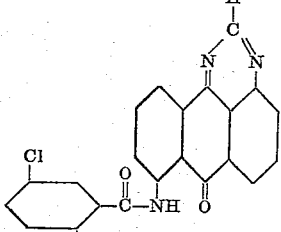

C.I. Vat Yellow 31.

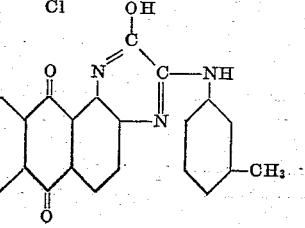

C.I. Vat Red 40.

TABLE I—Continued

| Vat Dyestuff (name or structural formula) | Old or New Color Index No. |
|---|---|
| [structure] | C.I. Vat Blue 4. |
| [structure] | C.I. 68605. |
| [structure] | C.I. Vat Violet 19. |
| [structure] | C.I. Vat Brown 31. |
| [structure] | C.I. Vat Blue 31. |
| [structure] | C.I. Vat Red 41. |
| 5,5'-dichloro-7,7'-dimethylthioindigo | C.I. Vat Violet 2. |
| 4,5,4',5'-dibenzothioindigo | C.I. Vat Brown 5. |
| 2'-indole-5,5',6,7,7'-pentachlorothioindigo | C.I. Vat Violet 5. |
| 3'-indole-2-thianaphtheneindigo | C.I. 73635. |
| 1'-acenaphthene-2-thianaphthene | C.I. Vat Red 45. |

The dye solution is formed by dissolving one of the above-indicated dyes in an acid-pasting acid. By the term "acid-pasting acid," we mean those acids which are conventionally used in the well known acid-pasting processes for upgrading pigments and dyestuffs, which include sulphuric acid, oleum, chlorosulfonic acid, phosphoric acid, trichloroacetic acid, and other acids of comparable strength in which the vat dye is soluble without decomposition. For certain difficulty soluble dyes it is convenient to use mixtures with above-indicated acids, e.g. a mixture of sulfuric and chlorosulfuric acids. Sulfuric acid is preferred because of its cost and commercial availability.

The initial concentration of the acid used may conveniently vary between about 85 and 100 percent by weight. As the acid becomes more dilute, i.e. as concentration of water in the system is increased, it becomes increasingly difficult to compeletely dissolve the dyestuff. It is essential that the dyestuff be substantially completely dissolved to permit it to permeate the pores of the oxide coating. Concentrations as low as about 75 percent by weight are usually satisfactory for this purpose.

Alternatively, after the dye solution is formed, the concentration of the acid therein can be slowly reduced by the incremental addition of water. The increase in water concentration causes some of the vat dyestuff to separate from the solution by inverse precipitation in a finely divided form. The dyestuff particles precipitated by this technique are small enough to effect penetration of the pores of the anodized aluminum which, as we have already indicated, is essential to the method of the present invention. Using the inverse precipitation technique, the acid concentration of the dye solution can be gradually reduced to as low as about 65 percent by weight.

The depth of shade of the particular color applied may be varied from light to dark by decreasing or increasing the concentration of the dye in the acid. At low concentrations, light pastel shades are obtained. A practical minimum concentration of dye required to obtain a pastel shade is about 0.05 percent by weight based upon the weight of the acid. Excellent results are obtained using from about 0.5 to 5 percent by weight dyestuff. No particular advantage is obtained using a concentration of dye greater than about 10 percent by weight, because of the excess usage of dye involved. A concentration of dye beyond that which is soluble in the particular acid used is generally undesirable.

It is preferred, for purposes of the invention, to use the particular vat dyestuff in the form of a finely divided powder in order to make certain that the dye is substantially completely dissolved in the acid. This is conveniently accomplished by grinding the dyestuff to form a powder having a particle size of between 100 and 200 mesh (U.S. sieves). It is not necessary to use an acid-pasted or treated vat color, as a dyestuff base (which is vattable) prior to acid pasting, is quite suitable. In forming the solution the dyestuff should be introduced slowly into the acid with good agitation.

The dye may be applied to the oxide-coated surface by immersing the oxide-coated aluminum in the dye solution or, alternatively, by spraying, brushing, flowing or rolling. Spraying can be accomplished continuously by applying the dyestuff through adjustable spray heads, which can be raised or lowered over oxide-coated aluminum sheets moving on a continuous belt under the spray nozzles. Such a technique is particularly advantageous in coloring irregular or curved pieces of oxide-coated aluminum.

During the dye application step the dye solution is maintained at a temperature generally between about 10 and 75° C. It is essential to maintain the temperature of the dye solution below the decomposition of the vat dyestuff, preferably below about 75° C. No particular advantage is seen in using a temperature below about 10° C. because of the equipment costs involved.

It is advantageous, although not necessary, to protect the vat dyestuff against attack by the strong acid by adding to the dye solution from about 2 to 8 percent of a stabilizing agent, such as anhydrous boric acid, sodium sulfate, urea, and the like.

Adsorption of dye solution by the oxide-coated aluminum surface occurs almost immediately after the coating is contacted with the dye solution. When the dye is applied by dipping, it is generally convenient to allow the coated aluminum to remain in the solution for from one to ten minutes to assure maximum and uniform penetration by the dye into the aluminum oxide pores. Because of the rapid adsorption of dye within the oxide pores, the method of the invention is readily adaptable to continuous operation.

After the dye has been applied, the excess dye solution is drained from the surface of the aluminum. Vat dyestuff particles are rapidly deposited in an insoluble form within the pores of the oxide coating (and perhaps chemically combined therewith) by flushing with an aqueous diluent. This is conveniently accomplished by drowning or dipping the colored panel into a water bath. Alternatively, deposition or insolubilization of the dyestuff may be accomplished by contacting the colored panel with an aqueous spray or steam for a short period of time, e.g. from about 5 seconds to two minutes. It is preferable to convert the dyestuff within the oxide pores to an insoluble form as rapidly as possible to insure a uniform coloring of the aluminum surface. For this reason a water spray technique is particularly effective. When using any of the flushing techniques, the aqueous diluent or water may contain acids or organic diluents, provided that such materials do not adversely affect the rapid insolubilization of the dyestuff.

After the dye is deposited within the oxide pores, the pores may be substantially completely sealed to protect the colored panel against heat, ultraviolet light, abrasion and contamination. The sealing technique may be any of the methods conventional to the anodized aluminum art, such as those described in Tosterud, U.S. Patent No. 2,008,733, assigned to the Aluminum Company of America. These methods comprise immersing the coated aluminum for a short period of time in hot or boiling water or a hot or boiling aqueous metal salt solution, preferably a metal acetate solution. A particularly useful method of sealing involves immersing the colored oxide-coated aluminum in a 0.5 percent by weight solution of nickel acetate in water at a temperature of about 98° C. The pH of the nickel acetate bath is controlled between about 5.5 and 5.8 by the addition of acetic acid. The oxide-coated aluminum is allowed to remain in the sealing bath for between 5 and 10 minutes. Alternatively, the sealing bath may comprise 0.5 percent by weight nickel acetate, 0.1 percent by weight cobalt acetate, and 0.8 percent by weight boric acid dissolved in water. The boric acid serves to buffer the solution, thus making it easier to maintain the pH within the desired range. pH control is important in preventing sludge formation and avoiding conditions which would cause dissolution of the aluminum oxide coating.

After the colored aluminum is removed from the sealing solution, it is rinsed with distilled water and thoroughly dried using an air blast or, alternatively, by immersing the aluminum in denatured alcohol followed by air drying.

The dried, colored, oxide-coated aluminum may be polished by a light buffing action. The finished aluminum surface may be thereafter further protected by lacquering or waxing, if desired.

The colored aluminum panels, when prepared by the method of the invention, are remarkably light fast, even in very faint pastel shades. Light fastness is an essential property for colored aluminum panels for architectural and outdoor usage, since such panels are continuously exposed to the heat and ultraviolet rays of the sun, and the fading normally caused thereby cannot be tolerated. Light fastness is conveniently measured by accelerated laboratory testing methods involving exposure of the colored surface to an artificial source of ultraviolet light. The "Atlas Carbon Arc Fade-O-Meter—Type FDAR," a commercially available apparatus of this type, is quite suitable for obtaining such measurements. The sample to be tested is placed in the "Fade-O-Meter" and exposed to the light source. An exposure time of 1,000 hours in the "Fade-O-Meter" with little or no change in the color of the sample being tested shows that the light fastness of the sample is excellent for most purposes. Dyed panels produced by prior art methods cannot in most cases withstand such a prolonged exposure without objectionable fading, particularly when produced in light or pastel shades.

Our invention is further illustrated by the following examples.

Example I

A 1" x 6" panel of 99.3 percent aluminum was cleaned and degreased by immersion in an inhibited aqueous alkaline solution. The panel was then rinsed thoroughly with cold water and placed in a 50 percent by weight aqueous solution of nitric acid at room temperature for 30 seconds. After the nitric acid dip, the panel was again rinsed thoroughly with cold water. The aluminum panel was then anodized by making it the anode in a 15 percent by weight solution of chemically pure sulfuric acid in distilled water at 70° F. and treating it with a current having a density of 12 amperes per square foot for 63 minutes. The anodized panel was rinsed thoroughly in distilled water to remove all traces of acid and allowed to soak in a 50 percent by weight solution of nitric acid in distilled water for ten minutes. The panel was then thoroughly rinsed with distilled water and immersed in denatured alcohol to remove water from within the pores of the aluminum oxide coating.

A dye solution was prepared by dissolving, in 96 percent sulfuric acid, about 0.57 percent by weight, based on the weight of the acid, of the vat dyestuff dibenzanthrone (C.I. Vat Blue 20). The anodized aluminum panel was immersed in the dye solution at a temperature of 25° C. for about five minutes. After the panel was removed from the vat dye solution, it was allowed to drain by holding it vertically above the bath. After the excess dye solution had drained from the panel, it was immediately immersed in water to insolubilize the vat dyestuff within the pores of the anodic oxide coating.

The colored panel was then rinsed and the aluminum oxide pores were sealed for ten minutes in boiling water. The panel was polished lightly with pumice powder and thereafter was given two spray coats of methacrylate lacquer.

The finished panel had a blue pastel shade. It showed no appreciable change in shade after 1,000 hours' exposure in a "Fade-O-Meter," which indicated that the color was exceptionally light fast.

Example II

The procedure of Example I was substantially repeated using a 0.57 percent by weight solution of dimethoxydibenzanthrone (C.I. Vat Green 1) in 96 percent sulfuric acid. The finished panel had a bluish-green pastel shade of good light fastness.

Example III

The procedure of Example I was substantially repeated using 8,16-pyranthrenedione (C.I. Vat Orange 9) as the dye. The finished panel had a gold pastel shade of excellent light fastness.

Example IV

The procedure of Example I was repeated using as a dye an anthrimidecarbazole (C.I. Vat Brown 3). The finished panel had a pale brown pastel shade of excellent light fastness.

Example V

The procedure of Example I was repeated using as a dye a chlorinated indanthrone (C.I. Vat Blue 6). The finished panel had a blue pastel shade of excellent light fastness.

Example VI

The procedure of Example I was repeated using as a dye an anthraquinonedibenzthiazole (C.I. Vat Yellow 2). The finished panel had a pale yellow shade of good light fastness.

Example VII

The procedure of Example I was repeated using as a dye a dibromoindigo (C.I. Vat Blue 35). The finished panel had a pale blue color of good light fastness.

Example VIII

The procedure of Example I was repeated using as a dye an anthrimidecarbazole (C.I. Vat Brown 31). The finished panel had a reddish brown shade of good light fastness.

Example IX

The procedure of Example I was repeated using as a dye an anthraquinoneoxazole (C.I. Vat Red 10). The finished panel had a pale red color of good light fastness.

Example X

The procedure of Example I was modified by preparing the anodized aluminum in an electrolyte comprising 15 percent by weight chromic acid, rather than sulfuric acid. A dye bath was prepared as in Example I using as a dye 6,6'-diethoxythioindigo (C.I. Vat Orange 5). The finished panel had an orange pastel shade of excellent light fastness.

Example XI

A 1" x 6" panel of a high purity aluminum alloy containing small amounts of magnesium and silicon was anodized as in Example I. A dye solution was prepared by dissolving, in 96 percent sulfuric acid, about 4.25 percent by weight, based on the weight of the acid, of the anthrimidecarbazole used in Example IV (C.I. Vat Brown 3). The anodized panel was immersed in the dye solution at room temperature for two minutes and thereafter removed from the solution and allowed to drain. It was then sprayed with cold water to insolubilize the vat dyestuff. The oxide pores of the colored panel were sealed in a boiling aqueous solution containing two grams per liter of nickel acetate. The finished panel had a light bronze color of excellent light fastness.

Example XII

The procedure of Example XI was repeated using as a dye the dimethoxydibenzanthrone of Example II (C.I. Vat Green 1). The finished panel had a deep bluish green color of excellent light fastness.

Example XIII

The procedure of Example XI was repeated using as a dye 8,16-pyranthrenedione (C.I. Vat Orange 9) as in Example III. The finished panel had a pink gold color of excellent light fastness.

Example XIV

The procedure of Example XI was repeated using as a dye the chlorinated indanthrene of Example V (C.I. Vat Blue 6). The finished panel had a deep purple-blue color of excellent light fastness.

Example XV

The procedure of Example XI was substantially repeated with the exception that the dye bath concentration was modified to contain 2.8 percent by weight dyestuff. The dyestuff used was 6,6'-diethoxythioindigo (C.I. Vat Orange 5) as in Example X. The finished panel had a copper color of excellent light fastness.

Example XVI

The procedure of Example XV was repeated using as a dye a trichlorodibenzanthrone (C.I. Vat Blue 18). The finished panel had a bluish violet color of excellent light fastness.

Example XVII

The procedure of Example XV was repeated using as a dye an acylaminoazo-type vat dye available commercially as Indanthrene Brilliant Yellow 3G. The finished panel had a greenish yellow color of excellent light fastness.

Example XVIII

The procedure of Example XV was repeated using as a dye the "trans" isomer of a bis-benzimidazodiazapyrenedione (C.I. Vat Orange 7). The finished panel had a yellowish gold color of excellent light fastness.

Example XIX

The procedure of Example XVIII was repeated using the "cis" isomer of the dyestuff used therein (C.I. Vat Red 15). The finished panel had a pink copper color of excellent light fastness.

Example XX

The procedure of Example XI was substantially repeated with the exception that the concentration of the dye solution was modified to contain 4.5 percent by weight dyestuff. The dyestuff used was the anthraquinoneoxazole of Example IX (C.I. Vat Red 10). The finished panel had a copper color of excellent light fastness.

We have thus provided, for the first time, a method of coloring aluminum with water-insoluble vat dyestuffs to obtain a variety of light fast colors. The novel method of the invention is effective in depositing a vat dyestuff in insoluble form within the pores of oxide-coated aluminum; a result not heretofore obtainable by prior art attempts to disperse organic water-insoluble dyes or pigments in an aqueous bath, since the dye or pigment particle must be of extremely small size to penetrate the submicroscopic pores of the coated aluminum. None of the prior methods are generally effective in producing colored aluminum in light fast pastel shades.

In the copending application of William C. Cochran, filed even date herewith, there is described and claimed a method of coloring oxide-coated aluminum with organic colorants, in particular phthalocyanine pigments. The method described therein and the method of the present invention have thus provided for the first time oxide-coated aluminum in a wide variety of new and light fast colors.

Our novel method can be operated continuously with remarkable efficiency, since both the adsorption and the insolubilization of the dye within the anodic pores occurs almost immediately during the respective treatments. The dye solution can be continuously recirculated by means of a pump.

One other feature of the invention is noteworthy. Heretofore it has been economically unattractive to attempt to recover the dyestuff from the dye solution after the dyeing operation has been completed or after the dye solution has been spent by repeated use. Consequently, large storage tanks were required and additional dye was added to the solutions until they could no longer be used. In the present invention, the dye can be recovered from the acid solution by a simple rapid dilution of that solution with water. The dyestuff precipitates from solution and is removed therefrom by filtration. It is thereafter dried and ground for reuse.

We claim:

1. Method of coloring oxide-coated aluminum comprising applying a solution of a water-insoluble, acid-soluble vat dyestuff in an acid-pasting acid at a temperature not exceeding the decomposition temperature of said vat dyestuff to aluminum having an artificially produced oxide coating thereon, removing the excess of said solution, and contacting said aluminum with an aqueous diluent to insolubilize the dyestuff within the pores of the oxide coating.

2. Anodized aluminum having a water-insoluble, acid-soluble vat dye deposited in the anodic oxide pores, said dye having been deposited by the process of claim 1.

3. Method of coloring oxide-coated aluminum comprising forming a solution of a water-insoluble, acid-soluble vat dyestuff in an acid-pasting acid in which said dyestuff is soluble without decomposition, applying said solution to aluminum having an artificially produced oxide coating thereon at a temperature not exceeding about 75° C., removing the excess of said solution, and contacting the aluminum containing adsorbed dyestuff with an aqueous diluent to deposit the dyestuff in insoluble form within the pores of the oxide coating.

4. Method of coloring anodized aluminum comprising dissolving at least about 0.05 percent by weight of a water-insoluble, acid-soluble vat dye in an acid-pasting acid to form a dye solution, applying said solution to anodized aluminum at a temperature not exceeding about 75° C., removing the excess of said solution, and contacting said aluminum with water to deposit said dye within the pores of the anodized surface.

5. Method of coloring oxide-coated aluminum comprising dissolving from about 0.05 to 10 percent by weight of a water-insoluble, acid-soluble vat dyestuff in an acid-pasting acid of about 85 to 100 percent by weight concentration to form a dye solution, applying said solution to aluminum having an artificially produced oxide coating thereon at a temperature not exceeding about 75° C., removing the excess of said solution, contacting the aluminum containing adsorbed dyestuff with an aqueous diluent to deposit said dye within the pores of the oxide coating, and sealing said pores.

6. Method according to claim 5 wherein said acid is sulfuric acid.

7. Method according to claim 5 wherein said colored aluminum is contacted with water to precipitate said dyestuff within said pores.

8. Method of coloring anodized aluminum comprising dissolving a water-insoluble, acid-soluble vat dye in an acid-pasting acid of about 75 to 100 percent by weight concentration to form a dye solution, immersing said aluminum in said solution at a temperature not exceeding about 75° C., removing the excess of said solution, contacting the aluminum containing adsorbed dye with an aqueous diluent to deposit said dye within the pores of the anodized surface, and sealing said pores by immersing said aluminum in a hot aqueous bath containing a metal acetate.

9. Method according to claim 8 wherein water is added gradually to said dye solution in an amount sufficient to reduce the acid concentration of said solution to not less than about 65 percent by weight to inversely precipitate a portion of the vat dye in finely divided form before contacting said aluminum with said dye solution.

10. Method of coloring anodized aluminum comprising dissolving from about 0.5 to 5 percent by weight of a water-insoluble, acid-soluble vat dye in concentrated sulfuric acid to form a dye solution, contacting said solution with anodized aluminum at a temperature of about 10 to 75° C., removing the excess of said solution and contacting the aluminum containing adsorbed dye with water to deposit said dye in insoluble form within the pores of the anodized surface.

11. Method according to claim 10 wherein said dye solution contains a stabilizing agent to protect the vat dye from decomposition.

References Cited in the file of this patent

UNITED STATES PATENTS

| | | |
|---|---|---|
| 2,071,156 | Baer | Feb. 16, 1937 |
| 2,132,620 | Hill et al. | Oct. 11, 1938 |
| 2,785,098 | Cunningham et al. | Mar. 12, 1957 |
| 2,814,576 | Zickendraht et al. | Nov. 26, 1957 |
| 2,837,523 | Grelat et al. | June 3, 1958 |
| 2,927,872 | Cohn | Mar. 8, 1960 |
| 2,975,081 | Kirby et al. | Mar. 14, 1961 |

FOREIGN PATENTS

| | | |
|---|---|---|
| 542,138 | Great Britain | Dec. 29, 1941 |
| 593,239 | Great Britain | Oct. 13, 1947 |